Figure 4:
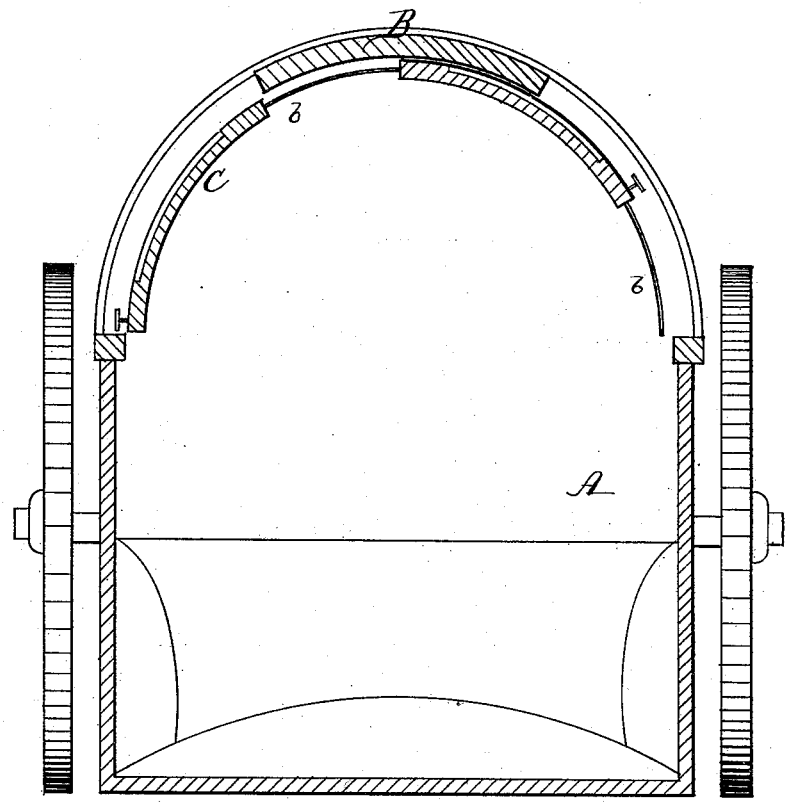

(No Model.) 2 Sheets—Sheet 1.
R. SPROUL.
DOOR OPERATING DEVICE FOR CABS AND OTHER VEHICLES.
No. 375,213. Patented Dec. 20, 1887.
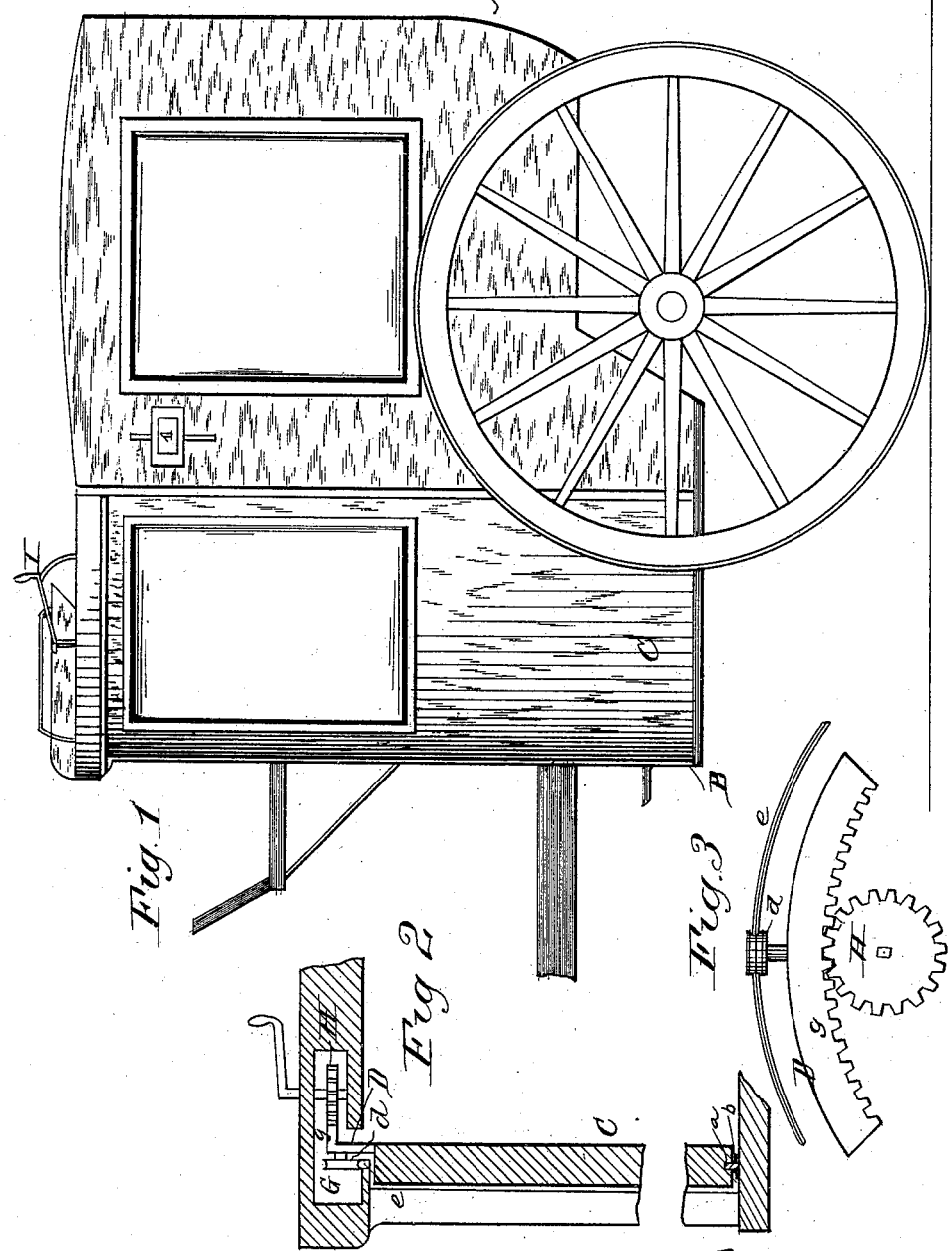
WITNESSES:
INVENTOR
ATTORNEYS (No Model.) 2 Sheets—Sheet 2.

R. SPROUL.
DOOR OPERATING DEVICE FOR CABS AND OTHER VEHICLES.

No. 375,213. Patented Dec. 20, 1887.

WITNESSES:

Robert Sproul
INVENTOR

BY
ATTORNEYS

UNITED STATES PATENT OFFICE.

ROBERT SPROUL, OF PITTSBURG, PENNSYLVANIA.

DOOR-OPERATING DEVICE FOR CABS AND OTHER VEHICLES.

SPECIFICATION forming part of Letters Patent No. 375,213, dated December 20, 1887.

Application filed June 23, 1887. Serial No. 242,322. (No model.)

*To all whom it may concern:*

Be it known that I, ROBERT SPROUL, a citizen of the United States, residing at Pittsburg, in the county of Allegheny and State of Pennsylvania, have invented certain new and useful Improvements in Door-Operating Devices for Cabs and other Vehicles; and I do hereby declare the following to be a full, clear, and exact description of the invention, reference being had to the accompanying drawings, which form a part of this specification.

This invention has relation to that class of vehicles known as "cabs," and particularly to such as are constructed with semicircular fronts or forward sides, having sliding doors located on either side of the central front wall, and in which the driver's seat is located above such front wall.

The object of this invention is to provide means whereby the movement of the cab-doors is rendered easier and their operation brought under the driver's control.

The invention accordingly consists, first, in providing a cab or similar vehicle with curved doors located on either side of and forming, when closed, portion of the front wall of the vehicle, and hanging or supporting said doors upon ways or guides by means of grooved rollers; second, in the combination, with the curved rolling doors of a cab or vehicle, of mechanism whereby the driver may operate the same while seated; third, in the novel construction and combination of devices pertaining to the improvement in cab-doors and operating mechanism, hereinafter described and claimed.

In the accompanying drawings, illustrating my invention, Figure 1 is a side elevation of a cab embodying my improvements. Figs. 2 and 3 are sectional and detail views, respectively. Fig. 4 is a horizontal section of a cab provided with my improvements.

A designates the body of the cab, having its front or forward portion of semi-cylindrical form, and comprising the narrow central wall, B, and the curved doors C C, located on either side. The doors are arranged and adapted to move in the arcs of a circle coincident with the curvature of the cab front or face, and are opened by being moved toward each other and behind the central wall, B, the latter being about or nearly equal in width to each of the doors. The doors are grooved in their lower edges, as shown at *a*, and slide upon a curved track, *b b*, attached to the floor of the vehicle. To the upper edge of the doors are curved brackets D, carrying grooved anti-friction rollers *d d*, which travel on tracks *e e*, laid upon the lower edges of recesses or rabbeted channels G, formed in the roof of the cab and corresponding in curvature with the doors.

The brackets D are formed with curved flanges *g g*, toothed on their rear edges so as to form racks, and may be separately attached to the doors.

On either side of the central line of the cab, and within a cavity or channel in the roof, is journaled a toothed horizontal pinion, H. These pinions engage with the racks and their shafts extend through the roof of the cab and carry cranks I, the latter being on either side of the driver's seat and within the convenient reach of the driver, who readily operates the doors by turning the cranks.

The door supporting and operating devices, with the exception of the pinion-shafts, are hidden from view, and hence do not mar or detract from the appearance of the cab.

The doors move with an easy noiseless motion, and may be opened or closed without difficulty by the driver without interfering with his control of the reins.

Having described my invention, what I claim, and desire to secure by Letters Patent, is—

In a cab or similar vehicle, the combination, with curved door-carrying grooved rollers mounted on curved tracks above the door, of a curved rack or toothed bar attached to the door, a pinion engaging therewith and mounted in the roof of the cab, and a crank or handle attached to the pinion-shaft, substantially as described.

In testimony that I claim the foregoing I have hereunto set my hand this 16th day of June, 1887.

ROBERT SPROUL.

Witnesses:
THOS. A. CONNOLLY,
H. C. EVERT.